3,173,888
DIESTERS OF DIGLYCOLIC ACID AND VINYL CHLORIDE POLYMERS PLASTICIZED THEREWITH
Paul T. Von Bramer and Robert M. Simons, Kingsport, Tenn., assignors to Eastman Kodak Company, Rochester, N.Y., a corporation of New Jersey
No Drawing. Filed Nov. 13, 1962, Ser. No. 237,296
7 Claims. (Cl. 260—31.8)

This invention relates to novel esters and to plastic compositions containing such esters and more particularly to novel diesters of diglycolic acids and to vinyl polymer compositions plasticized with such diesters.

Various substances have been suggested as plasticizers for vinyl chloride polymers. One of the first used for poly(vinyl chloride) was tricresyl phosphate. This had the disadvantage that it produced compositions that were brittle and inflexible at low temperatures. In recent years phthalate esters and particularly the dioctyl phthalates (DOP) have been widely used. However, the phthalate esters are relatively expensive and a need has existed for an economical plasticizer for vinyl chloride polymers that is equal to or better than the phthalates in the various important properties required of plasticizers such as low temperature properties, color, thermal and hydrolytic stability, permanence, etc.

The present invention is based on our discovery of certain novel diesters of diglycolic acid and our discovery that these esters are unexpectedly valuable plasticizers for vinyl chloride polymers. Diglycolic acid is a relatively inexpensive dibasic acid and diesters of this acid are known. However, they have not been entirely satisfactory as plasticizers for uses in which hydrolytic and thermal stability are needed. We have now discovered a particular class of esters of diglycolic acid which offer the advantage of economy while avoiding disadvantages of previous esters of diglycolic acid.

The esters of our invention are diesters of diglycolic acid with 2,2-dimethylalkanols of 10 to 12 carbon atoms, e.g., di-(2,2-dimethyloctyl) diglycolate and di-(2,2-dimethyldecyl) diglycolate. Our invention also includes vinyl polymer compositions plasticized with such esters. We have found that these potentially low cost esters when used in the normal concentrations of plasticizers impart excellent properties to vinyl chloride polymers. The properties of milled vinyl plasticized with the novel esters are substantially equal to those obtained with the more expensive DOP. In some respects the properties are superior to those obtained with DOP.

The esters of the invention are particularly valuable as plasticizers for vinyl plastisols. The latter are dispersions or suspensions of the solid vinyl resin in the liquid plasticizer. They are fluid or paste-like compositions which contain no volatile solvent. The plasticizer is present in a rather high proportion, e.g., 50 to 100 phr., and is essentially the only dispersing medium for the resin.

Plastisols can be poured into molds or spread as coatings and are particularly useful in the technique of slush molding. Since they are used as fluids, the viscosity or flow characteristics of plastisols are important and should remain reasonably stable during storage. Vinyl plastisols containing the esters of the invention are characterized by excellent low temperature properties, low initial viscosities and good viscosity stability upon aging. The fact that the inexpensive non-phthalate type esters of our invention are comparable to or superior to DOP in plasticizing vinyl chloride polymers is unexpected and represents a valuable contribution to the art.

The novel esters of the invention can be prepared by the reaction of the selected $C_{10}$-$C_{12}$ 2,2-dimethylalkanol with diglycolic acid in approximately 2:1 mole ratios and in the presence of an esterification catalyst, for example, an acid catalyst such as p-toluenesulfonic acid, concentrated sulfuric acid, or the like. If desired, an inert water entrainer such as xylene, toluene or benzene can be added to the reaction mixture. The reaction can be represented by the following equation:

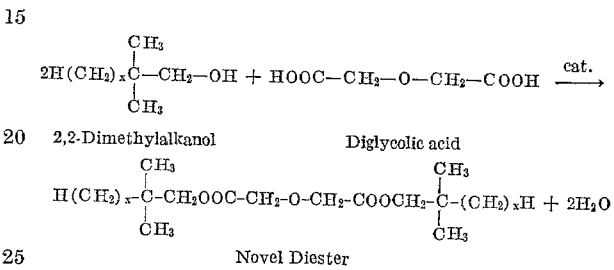

wherein $x$ is an integer from 6 to 8.

The preparation of the novel esters is illustrated by the following example.

EXAMPLE 1.—Di-(2,2-DIMETHYLOCTYL) DIGLYCOLATE

The charge to the reaction vessel consists of 1270 g. (8 moles) of 2,2-dimethyloctanol, 470 g. (3.5 moles) of diglycolic acid and 1.75 g. (0.1 percent of total charge) of the catalyst, p-toluene sulfonic acid. These materials are added to a three-liter four-necked flask equipped with stirrer, thermometer, nitrogen inlet tube, and Dean-Stark trap with attached reflux condenser. Nitrogen is passed into the solution for approximately thirty minutes at room temperature. Then heat is applied by means of a heating mantle and stirring is begun. The temperature is maintained at 170° C. for four hours and then gradually raised to 190° C. for two hours. At the end of the six-hour reaction period, an acid number of one to three is reached and the crude ester is cooled to 70° C. and transferred to a three-liter separatory funnel. The material is washed once with a liter of 5 percent sodium hydroxide solution, then with several liter portions of water (until the washings are neutral). The neutralized ester is dried over calcium sulfate, filtered through a filter-aid bed, and then stripped under reduced pressure (base heat 190° C./0.1 mm.). The stripped ester is stirred with activated carbon (0.5 percent) at 100° C. for thirty minutes and the carbon is removed by filtration.

The recovered ester was established by gas chromatography to be 99 percent pure di-(2,2-dimethyloctyl) diglycolate having the following properties: refractive index ($n_D^{25°\,C.}$), 1.4458; freezing point −20° F.; specific gravity at 23° C., 0.9392; Brookfield viscosity, No. 2 spindle at 60 r.p.m., 50 centipoises; flash point (Cleveland Open Cup), 435° F.; fire point (Cleveland Open Cup), 465° F.; color, Gardner Scale, 1; and acid number, 0.1.

EXAMPLE 2.—DI-(2,2-DIMETHYLDECYL) DIGLYCOLATE

The novel ester di-(2,2-dimethyldecyl) diglycolate is prepared by substantially the same procedure as described above but employing 2,2-dimethyldecanol as the alcohol. The reaction product was determined by gas chromatography to be di-(2,2-dimethyldecyl) diglycolate of 90 percent purity and had the following properties: freezing point, −30° F.; Brookfield viscosity, No. 2 spindle at 60 r.p.m., 55 centipoises; flash point (Cleveland Open Cup), 455° F.; fire point (Cleveland Open Cup), 480° F.; specific gravity at 23° C., 0.9405; a color, Gardner Scale, of 1 and an acid number of 0.3.

The esters of our invention, as prepared in Examples 1 and 2, are characterized by good hydrolytic and thermal stability. In these respects we have found that they are markedly superior to other esters of diglycolic acid such as diesters of diglycolic acid with straight chain alkanols. For example, the esters of the invention are markedly more resistant to hydrolysis than the corresponding diglycolate esters of straight chain alcohols. Furthermore, poly(vinyl chloride) samples plasticized with the esters of the invention, as compared with such compositions plasticized with a straight chain alkanol diglycolate, demonstrate markedly better resistance to extraction of the plasticizer by soapy water and markedly better elongation retention in tests run for 7 days at elevated temperature.

The 2,2-dimethylalkanols used in the preparation of our novel esters can be prepared by known procedures. Preferably, however, they are prepared by a recently developed telomerization process. In this procedure, a lower alkyl ester of isobutyric acid, such as isobutyl isobutyrate, is contacted with ethylene at a pressure of 400 to 2000 p.s.i.g. and at a temperature of 100 to 300° C. in the presence of an organic peroxide catalyst, such as cumene hydroperoxide. The resulting product comprises telomer esters containing, e.g., from 1 to 5 units of ethylene per molecule added to the number two carbon atom of the isobutyric acid moiety of the starting ester, and specifically includes esters of 2,2-dimethyloctanoic acid and 2,2-dimethyldecanoic acid. The latter are separated and are subjected to catalytic hydrogenation to yield the alcohols employed in our process, namely, 2,2-dimethyloctanol and 2,2-dimethyldecanol.

The plastic compositions of the invention comprise a vinyl chloride polymer plasticized with one or both of our novel esters. The esters of our invention can be present as the sole plasticizer or can be used wtih one or more other plasticizers and normally will be used with minor amounts of conventional additives such as stabilizers, inorganic fillers, or the like. Normally the vinyl chloride polymer is the major component and the ester plasticizer of the invention is present in amounts, e.g., of 25 to 100 parts by weight per 100 parts of resin. In general, it can be said that the ester is present in a plasticizing amount, which is an amount sufficient to improve the flexibility of the vinyl chloride polymer.

The physical compounding of the plasticized compositions of the invention can be performed by known procedures. For example, they can be compounded with conventional equipment of the heated roll or internal mixer types. The plasticizer and other ingredients such as fillers and stabilizers are worked into the resin so that they are fully dispersed. The resultant composition is then molded, calendered, extruded, cast or otherwise formed into articles of the desired shape or applied by knife coating or dip coating or otherwise as a protective coating.

In describing the plastic compositions of our invention in the specification and claims we use the term "vinyl chloride polymer" in its broad sense to include all types of resins formed by polymerization of vinyl chloride with itself or with other co-polymerizable monomers. Such resins include: poly(vinyl chloride), i.e., the resin formed by homo-polymerization of vinyl chloride, and various copolymers formed by copolymerization of a major amount of vinyl chloride with a minor amount of one or more other mono-ethylenically unsaturated monomers that are co-polymerizable with vinyl chloride. Such co-polymers include: vinyl chloride-vinyl acetate interpolymers containing, for example, 60 to 95 weight percent vinyl chloride, and 40 to 5 weight percent vinyl acetate; interpolymers of vinyl chloride with minor proportions of vinylidene chloride, e.g., 5 to 20 weight percent of the latter; interpolymers of vinyl chloride with minor proportions of maleic or fumaric esters such as 10 to 20 weight percent diethyl maleate or diethyl fumarate; vinyl chloride-acrylic ester copolymers such as interpolymers of vinyl chloride with methyl, ethyl, butyl or octyl acrylate in ratios, e.g., of 95 to 5, 90 to 10 or 80 to 20; copolymers of vinyl chloride with minor proportions of acrylonitrile; copolymers of vinyl chloride with vinyl alkyl ethers, e.g., 70 parts vinyl chloride with 30 parts vinyl isobutyl ether; and the like.

We have prepared compositions of our invention comprising vinyl resins plasticized with esters of the invention and have compared their properties with corresponding compositions containing phthalate plasticizers. In Table I below the properties of the esters of the invention as plasticizers in a typical milled vinyl formulation are compared with those of a dioctyl phthalate plasticizer, specifically, di-2-ethylhexylphthalate. In this and subsequent tables the esters of the invention are designated for purposes of brevity by the alternative nomenclature "neoalkyl diglycolates." Di-(2,2-dimethyloctyl) diglycolate and di-(2,2-dimethyldecyl) diglycolate are referred to, respectively, as "di-(neodecyl) diglycolate" and "di-(neododecyl) diglycolate."

*Table I.—Performance of neoalkyl diglycolates as plasticizers in vinyl plastics* [a]

| Property | ASTM Method | Plasticizer, p.h.r.[b] | | |
| --- | --- | --- | --- | --- |
| | | Di-(neodecyl) diglycolate | Di-(neododecyl) diglycolate | Dioctyl phthalate |
| Tensile strength, p.s.i. | D638 | 2,750 | 2,900 | 3,100 |
| Ultimate elongation, percent | D638 | 330 | 330 | 375 |
| 100% Modulus, p.s.i. | D638 | 1,350 | 1,650 | 1,525 |
| Tear resistance, p.p.i. | D1004 | 355 | 340 | 385 |
| Durometer hardness, 5 sec. | D1706 | 83 | 89 | 85 |
| Soapy water extraction, percent | D1239 | 0.7 | 0.6 | 0.4 |
| Heptane extraction, percent | D1239 | 25 | 29 | 23.5 |
| Activated carbon loss, percent | D1203 | 1.4 | 0.7 | 1.3 |
| Sample thickness, mils | | 12 | 10 | 10 |
| Retained elongation, percent | | 0 | 18 | 43 |
| Torsion modulus, ° C | D1043 | | | |
| 35,000 p.s.i. | | −25 | −28 | −26 |
| 135,000 p.s.i. | | −45 | −53 | −53 |

[a] Formulation:
Poly(vinyl chloride) resin (Geon 101), parts ____ 100
Ba-Cd stabilizer, p.h.r _____ 2
Epoxy stabilizer, p.h.r _____ 2
Plasticizer (as indicated), p.h.r _____ 50

[b] P.h.r.=Parts by weight per hundred parts of resin.

Table I shows that the properties of the milled vinyl plasticized with the esters of the invention parallel very closely those obtained with DOP. In some respects the properties obtained with our novel esters are superior to those obtained with DOP. For example, the di-(neodecyl) diglycolate is more active, as indicated by the lower 100 percent modulus. This means that less plasticizer is needed to obtain comparable flexibility. The di-(neododecyl) diglycolate shows lower activated carbon loss and better low temperature flexibility than the DOP composition.

We have said that the esters of the invention are valuable as plasticizers for vinyl plastisols. Table II presents some typical properties of vinyl plastisols containing our esters and offers a comparsion with the properties of plastisols containing DOP.

Table II.—Physical properties of vinyl plastisols[a] containing neoalkyl diglycolates

| Physical properties | Di-(neodecyl) diglycolate | | Di-(neododecyl) diglycolate | | Di-(2-ethylhexyl) phthalate | |
|---|---|---|---|---|---|---|
| | 50 p.h.r. | 75 p.h.r. | 50 h.p.r. | 75 p.h.r. | 50 p.h.r. | 75 p.h.r. |
| Tensile strength, p.s.i. | 2,250 | 1,800 | 1,800 | 1,650 | 2,600 | 2,000 |
| 100% Modulus, p.s.i. | 1,100 | 810 | 1,250 | 790 | 1,250 | 665 |
| Ultimate elongation, percent | 350 | 340 | 200 | 310 | 350 | 425 |
| Elongation retention, percent | 0 | 0 | 110 | 61 | 0 | 0 |
| Tear resistance, p.p.i. | 275 | 200 | 330 | 190 | 330 | 190 |
| Shore "A" durometer hardness, 5 sec | 67 | 65 | 77 | 70 | 69 | 65 |
| Soapy water ext. (1% soln.) loss, percent | 2.0 | 1.3 | 1.0 | 1.1 | 0.8 | 1.3 |
| Heptane extraction loss, percent | 32 | 30 | 28 | 36 | 24 | 29 |
| Activated carbon extraction: | | | | | | |
| Loss, percent | 1.4 | 1.3 | 1.1 | 1.3 | 2.2 | 3.2 |
| Thickness, mils | 12 | 11 | 9.0 | 8.0 | 11 | 7.0 |
| Torsion modulus, ° C.: | | | | | | |
| 35,000 p.s.i. | −40 | −48 | −35 | −50 | −32 | −46 |
| 135,000 p.s.i. | −63 | −65 | −57 | >−60 | −52 | >−60 |

[a] Formulation:
   Poly(vinyl chloride) resin (Geon 121), parts ____ 100
   Ba-Cd stabilizer, p.h.r _____ 2
   Epoxy stabilizer, p.h.r _____ 2
   Plasticizer, as indicated.

An important advantage of the esters of the invention when used as plasticizers in vinyl plastisols is that they impart low initial viscosities and excellent viscosity stability to the plastisols. Table III shows these excellent properties and offers a comparison with the properties of DOP compositions.

Table III.—Flow properties of vinyl plastisols[a] plasticized with neoalkyl diglycolates

| Plasticizer, p.h.r. | Viscosity (Brookfield, 25° C., Spindle Speed, 6 r.p.m.), cp., after— | | | Yield Value,[b] dynes/cm.², after— | | Fusion Temp., ° C. |
|---|---|---|---|---|---|---|
| | 1 day | 7 days | 21 days | 1 day | 21 days | |
| Di-(neodecyl) Diglycolate: | | | | | | |
| 50 | 4,700 | 7,600 | 8,500 | 60 | 96 | 144 |
| 75 | 2,000 | 3,100 | 3,000 | 18 | 18 | 142 |
| Di-(neododecyl) Diglycolate: | | | | | | |
| 50 | 11,300 | 13,700 | 17,000 | 180 | 300 | 160 |
| 75 | 2,200 | 2,700 | 2,600 | 24 | 30 | 157 |
| Di-(2-ethylhexyl) Phthalate: | | | | | | |
| 50 | 26,500 | 34,000 | 41,300 | 456 | 708 | 132 |
| 75 | 3,600 | 3,700 | 4,200 | 30 | 24 | 126 |

[a] Formulation:
   Poly (vinyl chloride) resin, parts _____ 100
   Barium-cadmium stabilizer, p.h.r _____ 2
   Epoxy stabilizer, p.h.r _____ 2
   Plasticizer as indicated.
[b] Yield value is force required to initiate flow.

The invention has been described in considerable detail with particular reference to certain preferred embodiments thereof, but it will be understood that variations and modifications can be effected within the spirit and scope of the invention as described hereinabove, and as defined in the appended claims.

We claim:
1. A plasticized composition comprising a vinyl chloride polymer selected from the group consisting of homopolymers of vinyl chloride and copolymers of vinyl chloride and a minor amount of at least one other monoethylenically unsaturated monomer that is copolymerizable therewith and a plasticizing amount of a compound of the formula:

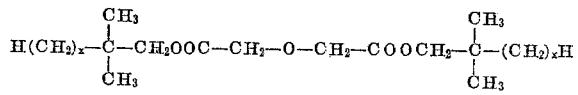

wherein $x$ is an integer from 6 to 8.

2. A plasticized composition comprising homopolymeric poly(vinyl chloride) resin and a plasticizing amount of di-(2,2-dimethyloctyl) diglycolate.

3. A plasticized composition comprising homopolymeric poly(vinyl chloride) resin and a plasticizing amount of di-(2,2-dimethyldecyl) diglycolate.

4. A plastisol composition comprising homopolymeric poly(vinyl chloride) resin and, as substantially the only dispersing medium for said resin, a compound from the group consisting of di(2,2-dimethyloctyl) diglycolate and di-(2,2-dimethyldecyl) diglycolate.

5. A compound of the formula:

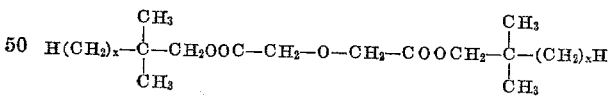

wherein $x$ is an integer from 6 to 8.

6. Di-(2,2-dimethyloctyl) diglycolate.
7. Di-(2,2-dimethyldecyl) diglycolate.

References Cited in the file of this patent

UNITED STATES PATENTS 3,000,747    Martin et al. _____ Sept. 19, 1961
3,057,930    Dimler et al. _____ Oct. 9, 1962

OTHER REFERENCES

Buttrey: "Plasticizers," Cleaver-Hume Press, Ltd., 2nd Edition, 1957, pp. 58–60.